3,487,457
ELECTRIC MOTOR HAVING AN AIRGAP SLEEVE
Jean L. Drouard, Paris, and André A. Stavropoulos,
Antony, France, assignors to Moteurs Drouard,
Paris, France, a French body corporate
Filed Apr. 30, 1968, Ser. No. 725,338
Claims priority, application France, May 10, 1967,
105,919
Int. Cl. H02k 5/10, 5/12
U.S. Cl. 310—86                 5 Claims

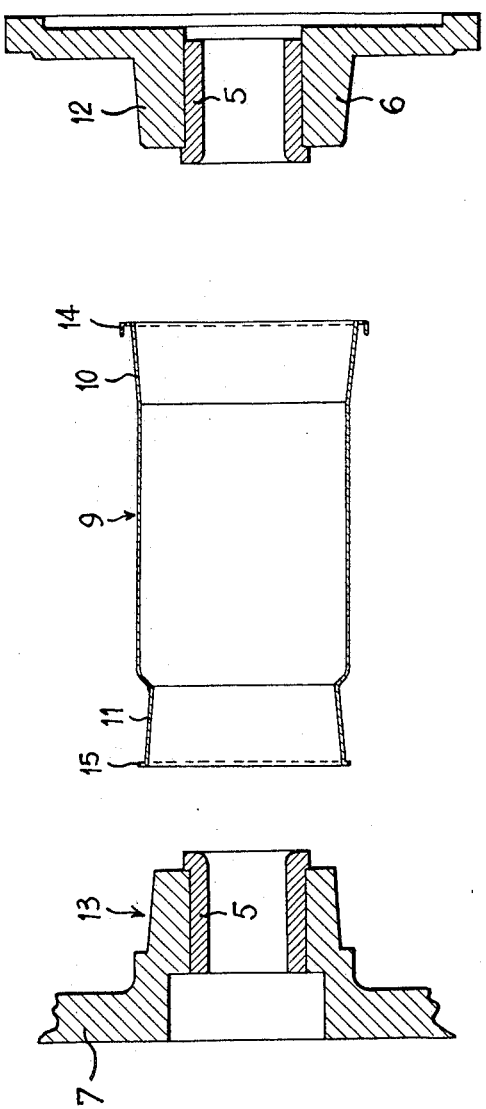

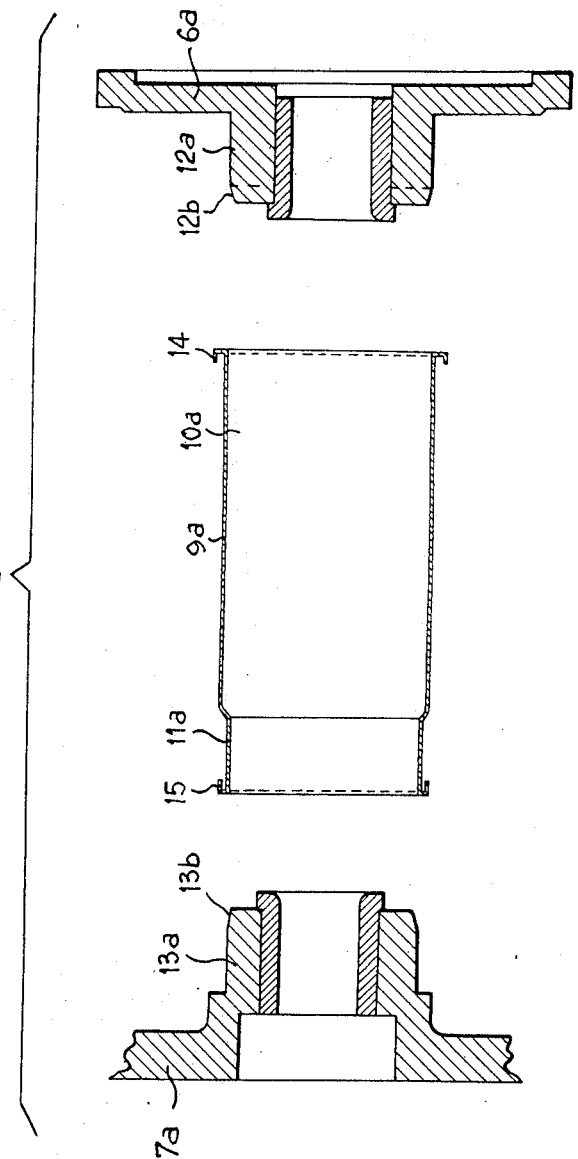

ABSTRACT OF THE DISCLOSURE

An electric motor having an airgap sleeve in the form of a cylinder whose two ends are fitted on corresponding bearing faces provided on the end walls forming bearings for the shaft of the rotor in such manner that these ends elastically grip the bearing faces.

---

The present invention relates to electric motors having an airgap sleeve and in particular motors employed for accelerators, circulation pumps in central heating systems, and pumps for the chemical industry.

It is known that the rotors of these motors are immersed in a liquid, such as water or other liquid, which the pump driven by the motor must pump through the hydraulic circuit (combined with the motor-pump unit).

In these motors, it is already known to protect in particular the stator by an airgap sleeve which screens off the stator from the liquid filling the gap between the rotor and stator. There is of course a sealing problem which has been solved in one arrangement by providing sealing elements between the ends of the sleeve and bearing faces provided on the bearing-walls in which the shaft carrying the rotor is journalled. However, the sealing elements proposed up to the present time have been found to have a limited life whenever the liquid in which they are immersed is at high temperature (the case of superheated water of certain central heating systems) or corrosive, in other words whenever this liquid is such that it is liable to attack the rubber or the like of which the sealing element is composed.

The object of the invention is to remedy these drawbacks.

The invention provides an electric motor having an airgap sleeve protecting the stator wherein said sleeve consists of a cylinder whose two end portions are fitted on two corresponding bearing faces provided on the end walls forming the bearings of the shaft of the rotor, in such manner that said end portions elastically grip said bearing faces.

Owing to this tight fit, a perfect seal is achieved between the sleeve and the two walls and consequently the annular cavity containing the elements of the stator is perfectly screened off from the gap between this cavity and the rotor which is full of the liquid pumped by the pump connected to the motor.

Further features and advantages of the invention will be apparent from the ensuing description with reference to the accompanying drawings.

In the drawings:

FIG. 2 is an exploded sectional view of the sleeve and the two bearings; and

FIG. 3 is a view similar to FIG. 2 of a modification of the invention.

Figure 1:
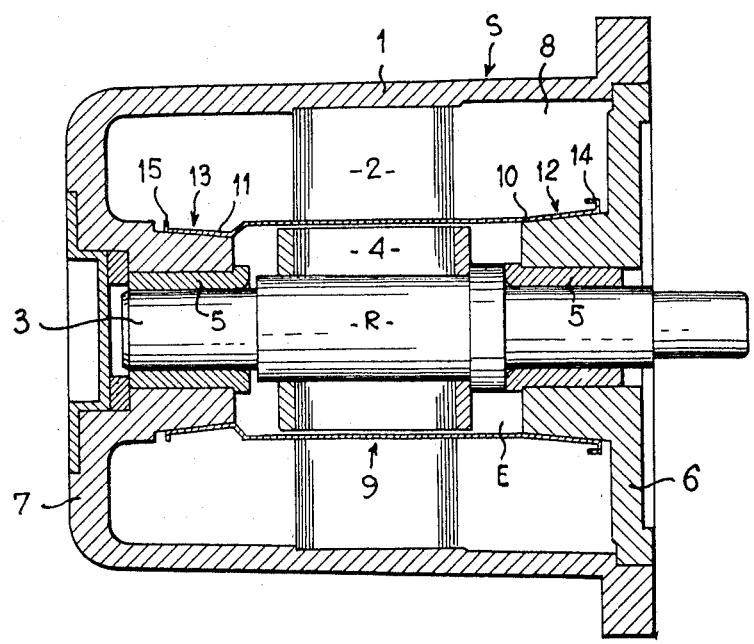
FIG. 1 is a diagrammatic longitudinal diametral sectional view of an electric motor according to the invention.

According to the embodiment shown in FIGS. 1 and 2, the motor comprises a stator S and a rotor R which are coaxial and define a gap E which is filled with the liquid intended to be pumped by the pump driven by the motor.

The stator and the rotor are of conventional design. As concerns the stator S, the latter comprises an outer frame 1 and a stack of laminations 2 or the like. The rotor R comprises a shaft 3 and a conventional stack of laminations 4. The shaft 3 is journalled in bushings 5 fitted in a bearing end wall 6 and in an end wall 7 which is preferably in one piece with the frame 1.

The stator S, and in particular its cavity 8 containing the heads of the windings (not shown), is screened off from the gap E between the stator S and the rotor R by an airgap sleeve. This sleeve comprises a cylinder 9 preferably of metal or metal alloy, such as stainless steel or copper, or of plastics material. Its centre portion is cylindrical and surrounds the part 4 of the rotor R and this cylindrical portion is extended by two frustoconical end portions 10 and 11 which are divergent from the centre portion. The portions 10 and 11 are a tight interference fit on corresponding bearing faces 12 and 13 having the same taper and provided on the bearings formed by the walls 6 and 7. The axial lengths are such that, when the wall 6 is placed against and fixed to the frame 1, the two portions 10 and 11 of the sleeve 9 are applied closely in a strictly fluidtight manner on the bearing faces 12 and 13. The diameters in the free state are preferably such that the portions 10 and 11 are, after assembly, under a slight elastic tension after having undergone a slight circumferential expansion at the end of the axial fitting travel.

It can be seen that by this very simple means of an assembly presenting absolutely no problem, the cavity 8 of the stator S is strictly sealed, there being no communication allowing the water or other liquid in the gap E to penetrate this cavity 8. The windings of the stator are consequently perfectly protected.

Preferably, the frustoconical portions 10 and 11 of the sleeve 9 terminate in two small flanges 14 and 15 which extend outwardly and ensure by the stiffening action thereof a perfectly circular shape of the largediameter ends of the portions 10 and 11 of the sleeve.

These frustoconical portions have such length that a slight clearance is maintained after assembly between the flanges and the adjacent frustoconical faces of the walls 6 and 7.

In the modification shown in FIG. 3, the sleeve 9ª is cylindrical and merely constricted at 11ª so as to be capable of being introduced in the bore of the stator laminations. The bearing faces 12ª and 13ª of the walls 6ª and 7ª are cylindrical and have a diameter slightly greater than the inside diameter of the cylindrical end portions 10ª and 11ª of the sleeve and these bearing faces terminate in chamfers 12ᵇ and 13ᵇ which facilitate the fitting and elastic expansion of the portions 10ª and 11ª of the sleeve 9ª.

In both embodiments, it is possible before assembly to very slightly coat the parts intended to come in contact with each other with oil or grease, for example of the silicone type which resists high temperatures, or with a seal paste having the same properties. This coating is in no way necessary for ensuring the seal, but merely has for purpose to facilitate a possible disassembly.

Although specific embodiments of the invention have been described, many modifications and changes may be made therein without departing from the scope of the invention as defined in the appended claims.

Having now described our invention what we claim as new and desire to secure by Letters Patent is:

1. An electric motor comprising a frame structure, a stator in said frame structure, a rotor coaxial with said stator and defining with the stator an airgap, said rotor having a shaft, said frame structure including end walls, bearings carried by said end walls in which said shaft is journalled, said end walls having bearing faces coaxial with said bearings, an airgap sleeve interposed between said rotor and said stator in said airgap, said sleeve consisting of a cylinder having two end portions engaged on said bearing faces with an interference fit in such manner that said end portions elastically grip said bearing faces.

2. A motor as claimed in claim 1, wherein the bearing faces and the end portions of the cylinder are frusto-conical.

3. A motor as claimed in claim 1, wherein the bearing faces and the end portions of the cylinder are cylindrical and the bearing faces terminate in chamfers adapted to produce an elastic expansion of the ends of the cylinder when fitting the cylinder and the bearing faces together.

4. A motor as claimed in claim 1, further comprising outer stiffening flanges on the cylinder which maintain the ends of said cylinder circular.

5. A motor as claimed in claim 1, further comprising, interposed between the surfaces of contact between the cylinder and the bearing faces, lubricant adapted to facilitate a subsequent disassembly.

References Cited

UNITED STATES PATENTS

| | | | |
|---|---|---|---|
| 3,053,189 | 9/1962 | White | 310—86 X |
| 3,128,712 | 4/1964 | Sence | 310—86 X |
| 3,229,130 | 1/1966 | Drouard | 310—54 |
| 3,231,768 | 1/1966 | Dannenmann | 310—86 |

WARREN E. RAY, Primary Examiner

U.S. Cl. X.R.

310—89, 90